US006434550B1

(12) United States Patent
Warner et al.

(10) Patent No.: US 6,434,550 B1
(45) Date of Patent: Aug. 13, 2002

(54) TEMPORAL UPDATES OF RELEVANCY RATING OF RETRIEVED INFORMATION IN AN INFORMATION SEARCH SYSTEM

(75) Inventors: Douglas K. Warner; James N. Richter, both of Bozeman, MT (US)

(73) Assignee: RightNow Technologies, Inc., Bozeman, MT (US)

( * ) Notice: Subject to any disclaimer, the term of this patent is extended or adjusted under 35 U.S.C. 154(b) by 0 days.

(21) Appl. No.: 09/549,566

(22) Filed: Apr. 14, 2000

(51) Int. Cl.$^7$ .............................................. G06F 17/30
(52) U.S. Cl. .................................... 707/3; 707/7; 707/1
(58) Field of Search ................ 707/3, 7, 5, 1, 707/6, 2, 513

(56) References Cited

U.S. PATENT DOCUMENTS

| | | | | |
|---|---|---|---|---|
| 6,006,218 A | * | 12/1999 | Breese et al. ................... | 707/3 |
| 6,021,409 A | | 2/2000 | Burrows ...................... | 707/102 |
| 6,272,507 B1 | * | 8/2001 | Pirolli et al. ................ | 707/513 |
| 6,370,525 B1 | * | 4/2002 | Kaufman ....................... | 707/3 |
| 6,370,526 B1 | * | 4/2002 | Agrawal et al. ................ | 707/5 |

FOREIGN PATENT DOCUMENTS

| | | | | |
|---|---|---|---|---|
| EP | 0551696 | 7/1993 | ......... | G06F/15/419 |
| WO | WO 99/48028 | 9/1999 | ........... | G06F/17/30 |
| WO | WO 01/16807 | 3/2001 | ........... | G06F/17/30 |

OTHER PUBLICATIONS

International Search Report (2 sheets) form PCT/ISA/210.

* cited by examiner

Primary Examiner—Sanjiv Shah
(74) Attorney, Agent, or Firm—Dorsey & Whitney LLP (57) ABSTRACT

An information retrieval system allows a user to search a database of informational items for a desired informational item, and presents the search result in the form of matching index entries in the order of relevance. The information retrieval system in accordance with the principles of the present invention assigns a relevance rating to each of the index entries without requiring an explicit input from the user with respect to the usefulness or the relevance of the retrieved information corresponding to the respective index entries. When the user selects and retrieves an informational item through a list of index entries presented by the retrieval system, as a result of a search, the relevance rating of the selected informational item is increased by a predetermined amount. The relevance rating of the selected informational item is further adjusted based on any actions the user takes subsequent to the initial selection of the informational item if the subsequent act indicates that the relevance of the selected informational item may be less than what is reflected by the rating increase by the predetermined amount. Ratings of the informational items in the database are determined from implicit suggestions from the usage of the retrieval system and the database by the user rather than from an explicit user input. In another aspect of the present invention, the ratings are allowed to decay over time to minimize the tendencies for historical usage biased rating, and to provide more temporally accurate ratings. The most recently accessed time of each of the informational items in the database is compared to a predetermined stale access time threshold, and if the most recently accessed time is older than the threshold, than the rating of the corresponding informational item is decreased to reflect the dated nature of the information contained within the item.

33 Claims, 5 Drawing Sheets

TEMPORAL UPDATES OF RELEVANCY RATING OF RETRIEVED INFORMATION IN AN INFORMATION SEARCH SYSTEM

RELATED APPLICATION

The present application is related to an application for U.S. Letters Patent, entitled "Implicit Rating of Retrieval Information in an Information Search System," U.S. Application Ser. No. 09/549,669, now pending filed Apr. 14, 2000 by the present inventors and assigned to the assignee of the present application.

TECHNICAL FIELD

The present invention generally relates to information search and retrieval systems. More particularly the present invention relates to implicitly establishing a relative ranking among information objects retrieved as a result of an information search in an information search and retrieval system.

BACKGROUND ART

A database is useful only if a desired item can be efficiently found and retrieved therefrom. To locate and retrieve a desired information item in an information database, a search of the database, e.g., based on a keyword or a text string, may be required. The search typically involves finding entries matching the keyword (or string) in an index created from parsing the information items into searchable words and the location in which the word appears in the database. For example, the Internet, or the world wide web (WWW) may be considered as a very large database of information items, in the form of web pages, distributed over a very wide network. Currently available search engines, e.g., the YAHOO™, EXCITE™, and the like, maintain an index of the entire content of the WWW parsed into searchable words and corresponding locations, e.g., the Uniform Resource Locators (URL).

At the conclusion of a search, all matching entries are returned to the user who selects therefrom the one particularly desired information item. Often, however, as the size of a database becomes very large (e.g., the number of web pages in the WWW is currently in the hundreds of millions, and growing fast), a search may return more matching entries than a typical user can ever review in a reasonable time. Thus, even if the search was effective in finding every matching entry, a user must still sift through an excessive number of returned entry to find the one desired information item. This problem—referred to as the "information overload" problem—diminishes the usefulness of the database.

Conventional search mechanisms, e.g., a web search engine, attempt to address the above information overload problem by presenting the matching entries in a more useful form thereby making it easier for the user to select therefrom. To this end, typically, each of the matching entries is ranked in terms of its relevance or usefulness. The matching entries are sorted according to, and presented to the user in the order of, the usefulness ranking. Thus, the user is first presented with information items that are purported to be the most useful and relevant. Obviously, the usefulness of the above relevancy rating would be largely dependent on how accurately the ratings can be made.

Conventional methods of relevancy rating rely on explicit feedback from users of the information items, i.e., by requesting the user to explicitly answer at least one question regarding the usefulness or the relevance of the retrieved information. For example, a user may be asked to answer either "yes" or "no" to a question "Was the information helpful?". Alternately, the user maybe asked, e.g., to choose from "very useful", "somewhat useful", "not useful", and the like. Thus, the accuracy of conventional relevancy ratings depends largely on the explicit inputs from the users of the information items.

Unfortunately, in practice, only a small number (e.g., less than 10 percent) of users even bother to respond to the rating requests, and conventional relevancy ratings are thus often not accurate predictions of the usefulness or the relevance of an information item. Accordingly, in a conventional informational database search, the order in which the retrieved information items are sorted and presented to the user is often nonsensical, and still requires the user to sift through an excessive number of items, and thus fails to effectively address the information overload problem.

Moreover, usefulness or relevance of an informational item may change over time as, for example, the information contained within the item may become outdated. However, once a relatively high relevancy rating is attributed to an informational item, the rated informational item may continue to appear in the earlier portion of the search result presented to the user. That is, a conventional rating method biases the database system to present retrieved information items in the order of a high overall historical rating, but without regard to the datedness of informational items or temporal preference.

Thus, what is needed is an efficient system for and method of rating the usefulness or the relevance of a retrieved informational item without requiring an explicit user feedback.

What is also needed is an efficient system and method for determining a temporally accurate usefulness or relevance rating of a retrieved informational item.

SUMMARY OF THE INVENTION

In accordance with the principles of the present invention, a method of, and an apparatus for, temporally updating relevancy ratings of a plurality of informational items in a information retrieval system comprises detecting an access of at least one of the plurality of informational items, the at least one of the plurality of informational items having a most recently accessed time, the most recently accessed time indicating time at which the at least one of the plurality of informational items was lastly accessed, determining an elapsed time since the most recently accessed time, comparing the elapsed time with a predetermined stale access time threshold value, and adjusting a relevancy rating of the at least one of the plurality of informational items if the elapsed time exceeds the predetermined stale access time threshold value.

In addition, in accordance with the principles of the present invention, a computer readable storage medium having stored thereon a computer program for implementing a method of temporally updating relevancy ratings of a plurality of informational items in a information retrieval system, the computer program comprises a set of instructions for detecting an access of at least one of the plurality of informational items, the at least one of the plurality of informational items having a most recently accessed time, the most recently accessed time indicating time at which the at least one of the plurality of informational items was lastly accessed, determining an elapsed time since the most recently accessed time, comparing the elapsed time with a predetermined stale access time threshold value, and adjusting a relevancy rating of the at least one of the plurality of informational items if the elapsed time exceeds the predetermined stale access time threshold value.

DESCRIPTION OF DRAWINGS

Features and advantages of the present invention will become apparent to those skilled in the art from the following description with reference to the drawings, in which.

DETAILED DESCRIPTION OF PREFERRED EMBODIMENTS

For simplicity and illustrative purposes, the principles of the present invention are described by referring mainly to an exemplar embodiment, particularly, with references to the Internet and the world wide web (WWW) as the exemplary databases of informational items. However, one of ordinary skill in the art would readily recognize that the same principles are equally applicable to, and can be implemented in, other informational database, and that any such variation would be within such modifications that do not depart from the true spirit and scope of the present invention.

In accordance with the principles of the present invention, an information retrieval system allows a user to search a database of informational items for a desired informational item, and presents the search result in the form of matching index entries in the order of relevance. The information retrieval system in accordance with the principles of the present invention assigns a relevance rating to each of the index entries without requiring an explicit input from the user with respect to the usefulness or the relevance of the retrieved information corresponding to the respective index entries. When the user selects and retrieves an informational item through a list of index entries presented by the retrieval system as a result of a search, the relevance rating of the selected informational item is increased by a predetermined amount.

The relevance rating of the selected informational item is further adjusted based on any actions the user takes subsequent to the initial selection of the informational item if the subsequent act indicates that the relevance of the selected informational item may be less than what is reflected by the rating increase by the predetermined amount. Ratings of the informational items in the database are determined from implicit suggestions from the usage of the retrieval system and the database by the user rather than from an explicit user input.

In another aspect of the present invention, the ratings are allowed to decay over time to minimize the tendencies for historical usage biased rating, and to provide more temporally accurate ratings. The most recently accessed time of each of the informational items in the database is compared to a predetermined stale access time threshold, and if the most recently accessed time is older than the threshold, than the rating of the corresponding informational item is decreased by a predetermined amount to reflect the dated nature of the information contained within the item.

Figure 1:
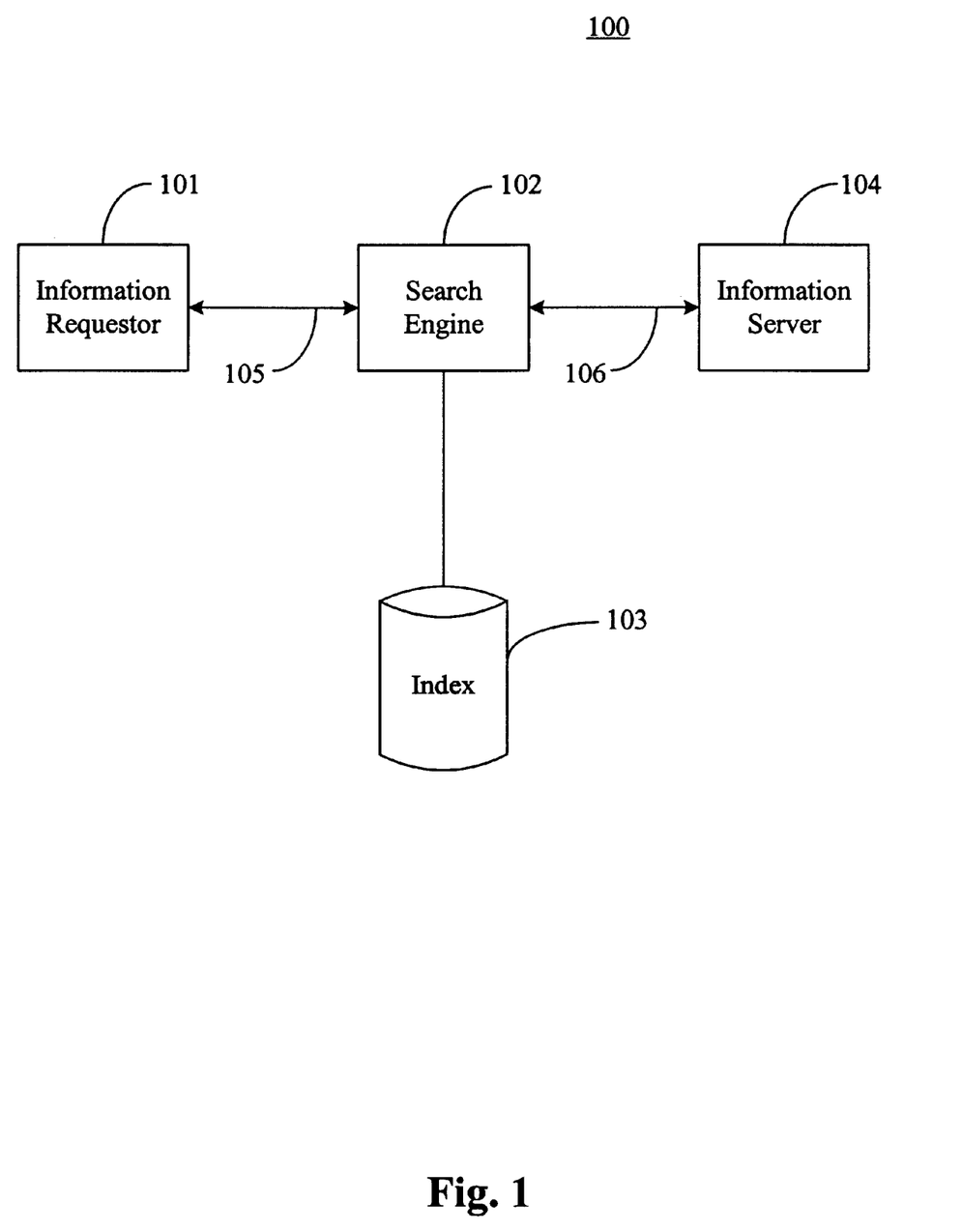
FIG. 1 is an exemplary block diagram of the information retrieval system in accordance with the principles of the present invention.

In particular, FIG. 1 shows an illustrative embodiment of the information retrieval system 100 in accordance with the principles of the present invention, which may comprise, in relevant part, inter alia, an information requester 101, a search engine 102 and an information server 104. The information retrieval system 100 maybe any system in which a plurality of informational items are available to be searched and retrieved. For example, the entire information retrieval system 100 may be housed within a single computer system, where the information server 104 may comprise a database containing a plurality of informational items stored in a mass storage device, e.g., a hard disk or the like, and where the information requester 101 may be a user interface through which a user may initiate a search and retrieval session with the search engine 102, which in turn may be an application program running on the computer. In this example, the communication interfaces 105 and 106 may be, e.g., bus(s) within the computer system.

Alternately, the information retrieval system 100 may even comprise a single computer program, in which each of the information server 104, information requester 101 and the search engine 102 may comprise a sub-component of the single computer program. In this case, communications interfaces 105 and 106 may themselves be computer routines acting as, e.g., program interfaces.

Figure 2:
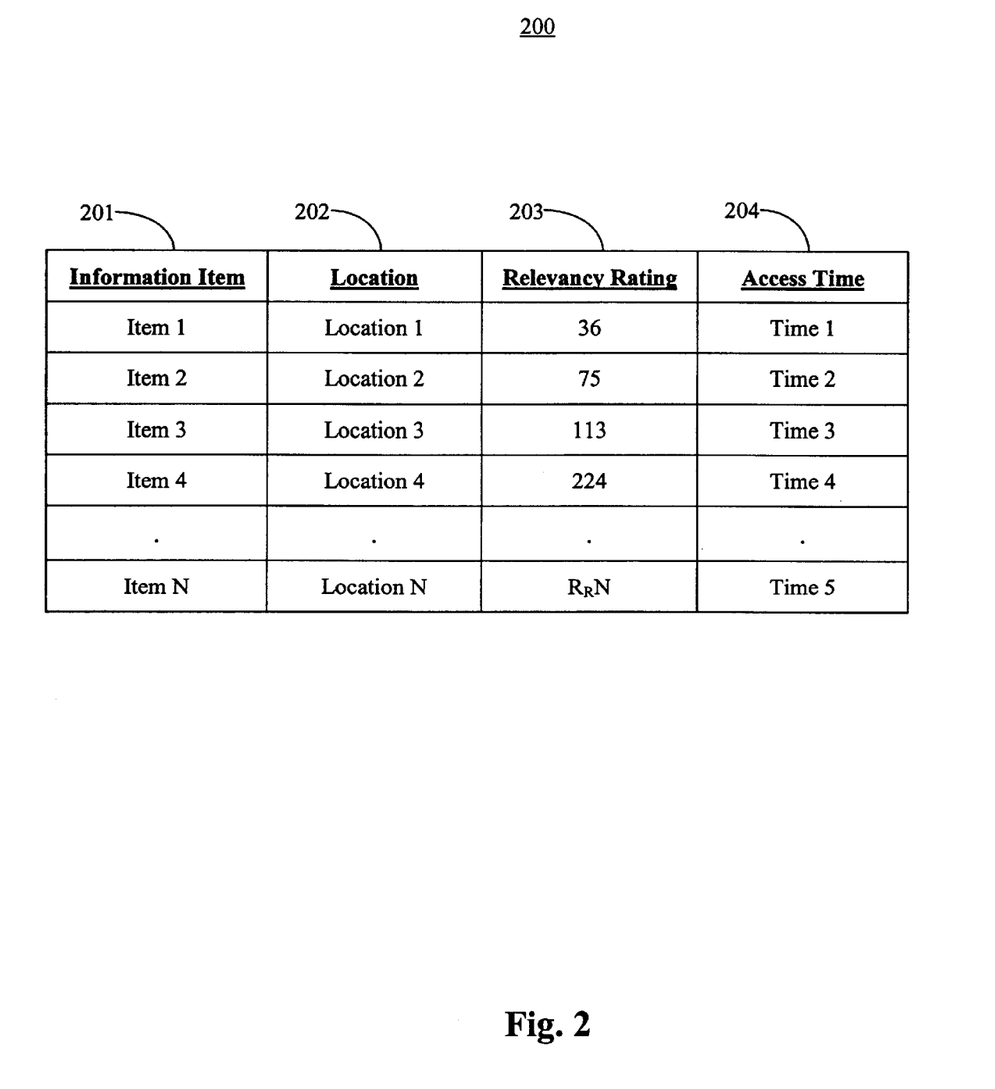
FIG. 2 is an exemplary table showing the relevant portions of the index shown in FIG. 1.

In a yet another alternative embodiment, the information retrieval system 100 may comprise a plurality of computers connected via a computer network. For example, the communication interfaces 105 and 106 may be a wide area network (WAN), e.g., the Internet, the world wide web (WWW), Public Switched Telephone Network (PSTN), or the like, through which each of the information requester 101, the search engine 102 and the information server 104 communicate. The information requester 101 may be, e.g., a personal computer connected to the Internet, e.g., via a modem or the like. The information server 104 may comprise a plurality of computers, e.g., web servers, distributed over the WAN 105, 106, e.g., the Internet. The search engine 102 may comprise any currently available and known search engines, e.g., the YAHOO™, EXCITE™, and the like, and may maintain an index 103 of the entire content of the WWW parsed into searchable words and corresponding locations as shown in FIG. 2. An example of a known search engine may also be found from, e.g., U.S. Pat. No. 6,02,409 issued Feb. 1, 2000 to Michael Burrows, the entirety of which is hereby incorporated by reference herein.

FIG. 2 shows the relevant portions 200 of the index 103. The index 103 in accordance with the principles of the present invention comprises, inter alia, an information item field 201 that uniquely identifies an information items, e.g., INFO#1 to INFO#n, a location Field (LOC) 202 containing the location pointers, e.g., the URL in the case of WWW pages, for the information items, a relevancy rating ($R_R$) field 203 contains the relevancy rating of the information items that indicates the relative usefulness of each of the informational items as related to each other, and a most recent access time ($t_{MRA}$) field 204 that contains the time stamp of the last time the respective informational item was accessed. The search engine 102 may periodically monitor the information server 104 via the communication interface 106 for any newly added informational items to be added the index 103.

In operation, when the information requester 101 requires an informational item, it initiates an information retrieval session by sending a search request to the search engine 102 via the communication interface 105. For example, the search request may be generated when a user of a client computer in a WAN, e.g., the Internet, enters a keyword WORD1 in the keyword entry field 302 of a user interface search screen 301 shown in FIG. 3A, and "clicks" on the search button 303. Upon receiving the search request, the search engine searches the index 103 for all entries that contain the keyword WORD1 in the index term field 201. The search engine 102 returns, via the communication interface 105, all matching entries to be displayed to the information requester 101.

Figure 3A:
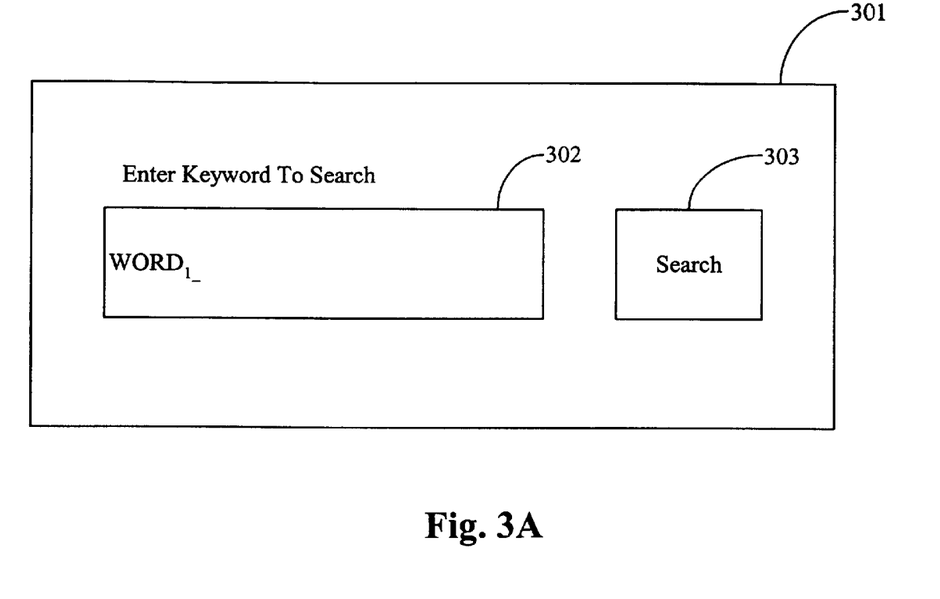
FIG. 3A shows an exemplary embodiment of the user interface search screen in accordance with the principles of the present invention.
Figure 3B:
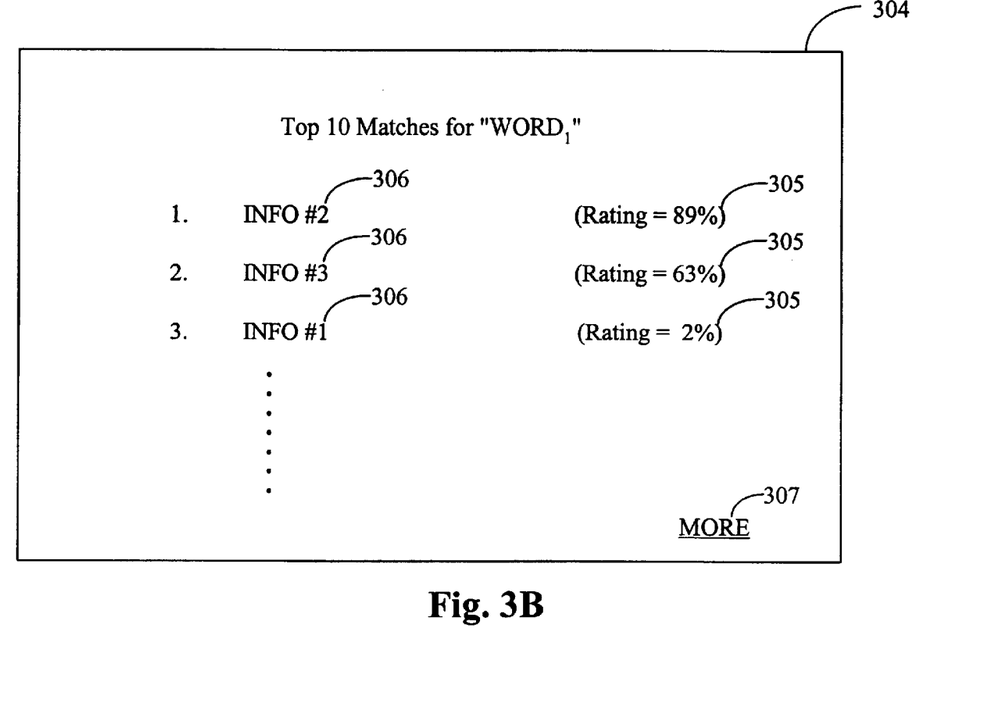
FIG. 3B shows an exemplary embodiment of the user interface search result screen in accordance with the principles of the present invention.

FIG. 3B shows an exemplary display format 304 of the returned matching entries. As shown, identifications 306 of, e.g., first few words or sentences, preferably with hyperlinks to, the matching informational items are displayed in the descending order of their respective informational importance 305. The informational importance is determined based on a combination of the degree that the search term WORD1 302 matched the information item and the relevancy rating 203 of that information item. The information requester 101 may request more matching entries in addition to the ones shown in the initial display screen by clicking on the "more" button 307.

Figure 4:
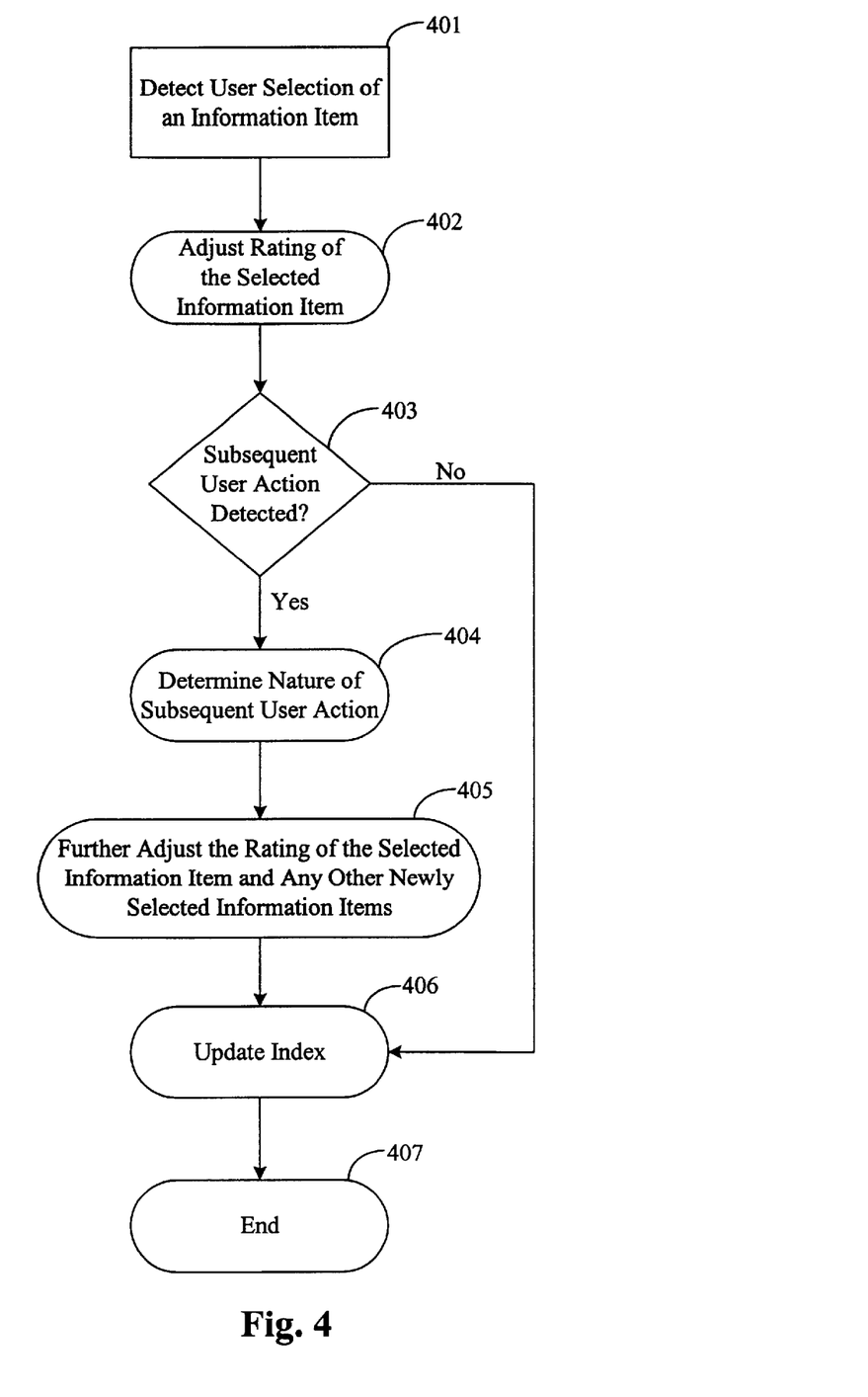
FIG. 4 is a flow diagram showing an exemplary embodiment of the relevance rating method in accordance with the principles of the present invention.

FIG. 4 shows an exemplary embodiment of the relevancy rating method in accordance of the principles of the present invention. In step 401, the present inventive information retrieval system 100 detects a selection, from the above described matching entry display screen, of an information item by the user, e.g., the INFO#1 306 having a present relevancy rating of R1. When the user selects an information item, e.g., by clicking on the provided hyperlink, a retrieval request is sent to the search engine 102 via the communication interface 105. Upon receiving the retrieval request, the information retrieval system 100 adjusts the rating of the selected information item. For example, a positive user feedback is assumed from the fact that the user made the selection, and thus the relevancy rating for the selected information item may be increased by a predetermined amount (RATE#1), e.g., two (2). The predetermined amount of increase represents the weight of the user selection to be attributed with respect to relevancy rating, and can be determined (and adjusted time to time) empirically by the search engine 102 from observing the performance behavior of the information retrieval system 100, or in the alternative, may be specified by the information requester 101 during the information retrieval session.

In step 403, a determination is made whether the user has taken an action subsequent to the initial selection detected during the step 401. If the user has not taken any action subsequent to the initial selection, then it is assumed that the initial adjustment of the relevancy rating (made in step 402)is correct, and the process flow proceeds to step 406 during which the adjusted relevancy rating is stored to update the index 103.

If, on the other hand, a subsequent action by the user is detected by the search engine 102 (e.g., when a request signal is received from the information requester 101 via the communication interface 105), the search engine 102 examines, in step 404, the request signal to determine the nature of the subsequent user action. From the nature of the subsequent user action, one can draw reasonable conclusions with regard to the relevancy and/or usefulness of the selected informational item.

It is assumed that by initial selection of an informational item, the user is providing positive feedback about that selected informational item. However, if the user subsequently selects additional informational items, submits a question, searches for additional informational items, and/or initiates a entirely new search, it can be concluded that the usefulness of the initially selected informational item may be less than originally assumed. Accordingly, The relevancy rating of the initially selected informational item may be adjusted downward by a second predetermined amount, RATE#2, in light of any of the above subsequent user action.

Finally, in step 406, the adjusted relevancy ratings of selected informational items are stored to update the index 103.

The following examples are provided to further illustrate the operation of the inventive relevancy rating method of FIG. 4. Assume, for example, that three adjustment factors, RATE#1, RATE#2 and RATE#3 are provided, where RATE#1>RATE#2 and RATE#1>RATE#3.

EXAMPLE 1

In step 401, when a user selection of an informational item, e.g., INFO#1 having a current relevancy rating of R1 (FIG. 3B), is detected, in step 402, the relevancy rating of INFO#1 is increased by RATE#1, e.g., two (2), to arrive at the adjusted relevancy rating of 38 for INFO#1. If the user takes no other action, the adjusted relevancy rating, i.e., 38, is stored in the index 103 in step 406. However, when retrieval request for INFO#2 is subsequently received (steps 404 and 405), the relevancy rating of INFO#1 is further adjusted, i.e., decreased by RATE#2, e.g., one (1), to arrive a a further adjusted relevancy rating for INFO#1,i.e.,37. Thus, the final relevancy rating used to update the index 103 is 37.

The relevancy rating of the subsequently selected informational item, INFO#2, may be increased by RATE#1, to arrive at an adjusted relevancy rating for INFO#2, e.g., 77.

If the user continues on to select another informational item, e.g., INFO#3, the relevancy rating of INFO#3 is increased by RATE1 while the relevancy rating of INFO#2 is decreased by RATE#2. The relevancy rating of INFO#1 would remain unchanged at +RATE#1−RATE#2, i.e., 37.

EXAMPLE 2

In step 401, when a user selection of an informational item, e.g., INFO#1, is detected, the relevancy rating of INFO#1 is increased by RATE#1 in step 402, to arrive at an adjusted relevancy rating for INFO#1. If the user takes no other action, the adjusted relevancy rating is stored in the index 103 in step 406.

However, when the information requester 101 subsequently submits, via the communication interface 105, a question with respect to the informational item being sought, the relevancy rating of INFO#1 is further adjusted, i.e., decreased by RATE#2, and the resulting adjusted relevancy rating is stored in the index 103, since the information item INFO#1 did not end the search.

EXAMPLE 3

In step 401, when a user selection of an informational item, e.g., INFO#1, is detected, the relevancy rating of INFO#1 is increased by RATE#1 in step 402, to arrive at the adjusted relevancy rating for INFO#1. If the user takes no other action, the adjusted relevancy rating is stored in the index 103 in step 406.

However, when the information requester subsequently initiates an additional search, e.g., send a search request over the communication interface 105, and if newly matched informational items, INFO#2 and INFO#3 were found as a result of the new search, the relevancy rating of INFO#1 is further adjusted, i.e., decreased by RATE#2. The relevancy ratings of both INFO#2 and INFO#3 are increased by RATE#3. The respective adjusted relevancy ratings are stored to update the index 103.

EXAMPLE 4

In this example, the inventive relevancy ranking method is utilized in presenting an ordered list of frequently asked questions (FAQs) on the World Wide Web, e.g., from a customer service web site. For simplicity, the initial relevancy ratings associated with each respective FAQ item in the service web site is assumed to have an initial value of zero (0). However, it should be readily apparent to one skilled in the art that the initial values of the relevancy ratings do not have to be initialized to zero, but are merely being assumed to provide an easier understanding of this example.

When a customer first visits the service web site, the customer is presented with a sorted list of FAQ titles. When the customer selects one of the FAQ titles to view in detail the respective FAQ item associated thereto, e.g., (FAQ#1), the relevancy rating associated with this selected FAQ item is increased by RATE#1 (e.g., 2 points), resulting in the new relevancy rating value of two (2). If this FAQ item satisfactorily answered the customer's question, the customer may choose to end the session at this point. However, if the customer continues on, e.g., by returning to the list of sorted FAQ titles, and selecting a second FAQ title to view the associated FAQ item (e.g., FAQ#2) in detail, the relevancy rating associated with the FAQ#2 is increased by RATE#1 (e.g., 2 points), while the relevancy rating associated with the FAQ#1 is decreased by RATE#2 (e.g., 1 point). The relevancy ratings of the FAQ items, FAQ#1 and FAQ#2, are now 1 and 2, respectively.

When, e.g., the customer once again returns to the sorted list of FAQ titles, and chooses yet a third FAQ title to view in detail the associated third FAQ item (FAQ#3). The relevancy rating for this FAQ#3 is increased by RATE#1 (e.g., 2 points), the relevancy rating for the secondly selected FAQ item (FAQ#2) is decreased by RATE#2 (e.g., 1 point), and the relevancy rating for the firstly selected FAQ item (FAQ#1) is not updated further. After this selection the resulting relevancy ratings are 1, 1, and 2 for the FAQ#1, FAQ#2, and FAQ#3, respectively.

Now, assume further that the customer was still unable to have the question answered satisfactorily. At this point the customer may enter a search query in an attempt to find an answer to the question. Assume the search returns three FAQ items, FAQ#4, FAQ#5, and FAQ#6. For all those FAQ items that successfully matched the query and thus are returned for the customer's selection, the respective associated relevancy rating for each matching FAQ item is increased by RATE#3 (e.g., 1 point), while the relevancy rating for the thirdly selected FAQ item (FAQ#3) is decremented by 1 point (RATE#2).

The resulting relevancy ratings for each of FAQ#1, FAQ#2, FAQ#3, FAQ#4, FAQ#5 and FAQ#6 are now all set at 1. At this point the customer decides one of the returned FAQ items (FAQ#4, FAQ#5 and FAQ#6), may contain the answer for the question, and selects to view the details of a fourth FAQ item (FAQ#4). The relevancy rating for this FAQ (FAQ#4) is increased by RATE#1 (e.g., 2 points). Since the previously viewed FAQ, e.g., the thirdly selected FAQ item (FAQ#3), has already been decremented by 1 point (RATE#2) during the search request, the relevancy rating is not further adjusted. The counter for the latest selected FAQ item (FAQ#4) is now set to 3, while relevancy ratings for the other FAQ items, i.e., FAQ#1, FAQ#2, FAQ#3, FAQ#5 and FAQ#6, remain at 1.

At this point the customer may decide that it is time to stop trying to find the answer from among the existing FAQ items, and instead ask his question directly to a customer service representative via a Web form, e.g., an e-mail. Upon submission, the last FAQ item that the customer viewed (FAQ#4) is decremented by 1 (RATE#2) to the final count of 2, and relevancy ratings for the other FAQ items involved during the session, i.e., FAQ#1, FAQ#2, FAQ#3, FAQ#5 and FAQ#6, remain unchanged at 1 point.

Thus, at the end of the customer's session, the relevancy ratings for the FAQ items with which the customer interacted would have experienced the following manipulations:

FAQ#1: initial value+RATE#1−RATE#2=0+2−1=1;

FAQ#2: initial value+RATE#1−RATE#2=0+2−1=1;

FAQ#3: initial value+RATE#1−RATE#2=0+2−1=1;

FAQ#4: initial value+RATE#3+RATE#1−RATE#2=0+1+2−1=2;

FAQ#5: initial value+RATE#3=0+1=1; and

FAQ#6: initial value+RATE#3=0+1=1.

As can be appreciated, the inventive relevancy rating system described above, determines the relevancy rating of informational items, without requiring an explicit rating by a user by providing a weighted adjustments of the ratings based on the usage of the informational items by the users. The inventive relevancy rating system can be used to augment conventionally known rating systems, or could supplant conventional explicit rating methods when the conventional method is unavailable and/or in appropriate.

In another aspect of the present invention, the relevancy ratings are allowed to decay over time to mimimize the tendencies for historical usage biased rating, and to provide a more temporally accurate ratings. The most recently accessed time of each of the informational items in the database is compared to a predetermined stale access time threshold, and if the most recently accessed time is older than the threshold, then the rating of the corresponding informational item is decreased to reflect the dated nature.

Figure 5:
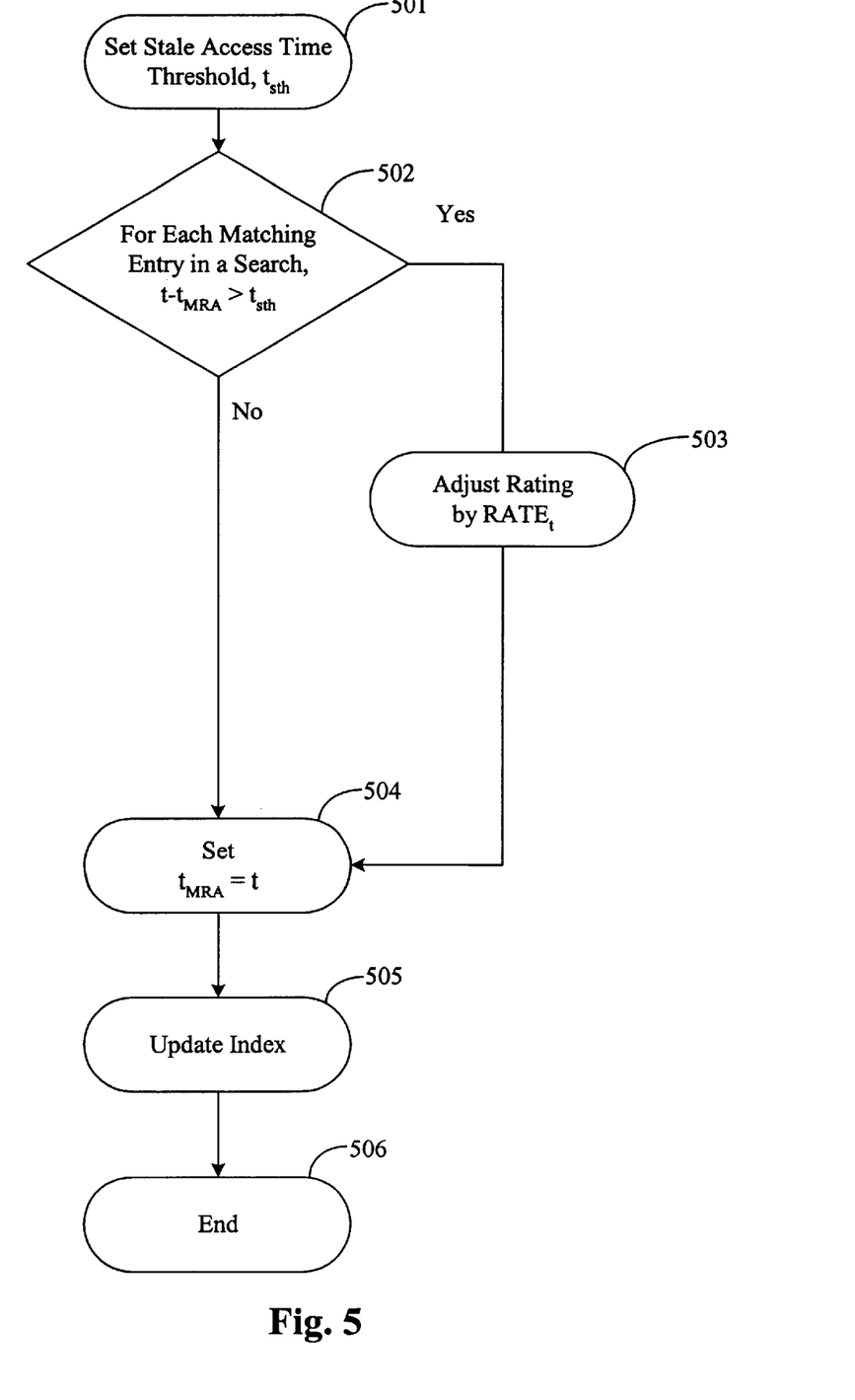
FIG. 5 is a flow diagram showing an exemplary embodiment of the temporally accurate relevance rating method in accordance with the principles of the present invention.

In particular, FIG. 5 shows an illustrative embodiment of the temporal adjustment for the relevancy ratings. According to this embodiment, instep 501, a stale access time threshold value ($t_{sth}$) is determined. The $t_{sth}$ represents a predetermined length of time duration between consecutive accesses of an informational item. Expiration of the $t_{sth}$ requires an adjustment of the relevancy rating of that informational item.

In step 502, for each of the matching entries of the index 103 after a search, a determination whether the elapsed time since the last time of access of the respective informational item, i.e., the current time t minus $t_{MRA}$ 204 (t−$t_{MRA}$), exceeds the $t_{sth}$. If the threshold is exceeded, it is assumed that, for the purpose of relevancy rating, that the information is stale, and thus the relevancy rating of the informational item is adjusted (or "aged") by a predetermined temporal adjustment factor $RATE_t$ in step 503. If on the other hand, in a preferred embodiment of the present invention, the threshold has not been exceeded, then, in step 504, the $t_{MRA}$ 204 of the informational item is preferably set to equal the current time to avoid excessive aging of an information item.

Finally, in step 505, the index 103 is updated to reflect any changes to the relevancy rating and/or the $t_{MRA}$ 204.

Both the stale access time threshold value ($t_{sth}$) and the temporal adjustment factor $RATE_t$ can be chosen based on the desired temporal sensitivity of the relevancy ratings. For example, the threshold value may be set to be an arbitrarily large time duration, e.g., 1000 years, for the minimal temporal sensitivity. The threshold value may, on the other hand, be set to a much smaller time duration, e.g., one day or even one hour, for maximum temporal sensitivity, and to place a strong bias for those informational items that have been recently accessed. Similarly, e.g., setting the $RATE_t$ to 100 percent will effectively erase all historical ratings older than the specified $t_{sth}$. Setting the $RATE_t$ to zero percent will result in the minimal temporal sensitivity of the relevancy ratings, i.e., no ratings being aged.

The threshold value and the adjustment factor may be determined empirically to tune the information retrieval system for optimal performance, and may be set by the system administrator of the retrieval system, or in the alternative, the user, i.e., the information requester 101, maybe allowed to specify per search request basis, e.g., providing an input capability for the respective values in the search screen shown in FIG. 3A.

As can be appreciated, the inventive relevancy rating aging system described above, allows the rating to decay over time to minimize the tendencies for historical usage biased rating, and to provide a more temporally accurate ratings.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method of temporally updating relevancy ratings of a plurality of informational items in a information retrieval system, comprising:

detecting an access of at least one of said plurality of informational items, said at least one of said plurality of informational items having a most recently accessed time, said most recently accessed time indicating time at which said at least one of said plurality of informational items was lastly accessed;

determining an elapsed time since said most recently accessed time;

comparing said elapsed time with a predetermined stale access time threshold value; and adjusting a relevancy rating of said at least one of said plurality of informational items if said elapsed time exceeds said predetermined stale access time threshold value.

2. The method of temporally updating relevancy ratings in accordance with claim 1, further comprising:

updating said most recently accessed time to be equal to a time of said detected present access of said at least one of said plurality of informational items.

3. The method of temporally updating relevancy ratings in accordance with claim 1, further comprising:

storing said adjusted relevancy rating for said at least one of said plurality of informational items.

4. The method of temporally updating relevancy ratings in accordance with claim 2, further comprising:

storing said updated most recently accessed time of said at least one of said plurality of informational items.

5. The method of temporally updating relevancy ratings in accordance with claim 1, wherein said step of adjusting said relevancy rating comprises:

decreasing said relevancy rating by a predetermined temporal adjustment factor.

6. The method of temporally updating relevancy ratings in accordance with claim 5, wherein:

said temporal adjustment factor is determined based on a desired temporal sensitivity of said relevancy ratings.

7. The method of temporally updating relevancy ratings in accordance with claim 6, wherein:

said temporal adjustment factor is determined empirically.

8. The method of temporally updating relevancy ratings in accordance with claim 5, further comprising:

allowing a user of said information retrieval system to directly input said temporal adjustment factor.

9. The method of temporally updating relevancy ratings in accordance with claim 1, wherein:

said stale access time threshold value is determined based on a desired temporal sensitivity of said relevancy ratings.

10. The method of temporally updating relevancy ratings in accordance with claim 9, wherein:

said stale access time threshold value is determined empirically.

11. The method of temporally updating relevancy ratings in accordance with claim 1, further comprising:

allowing a user of said information retrieval system to directly input said stale access time threshold value.

12. An apparatus for temporally updating relevancy ratings of a plurality of informational items in a information retrieval system, comprising:

means for detecting an access of at least one of said plurality of informational items, said at least one of said plurality of informational items having a most recently accessed time, said most recently accessed time indicating time at which said at least one of said plurality of informational items was lastly accessed;

means for determining an elapsed time since said most recently accessed time;

means for comparing said elapsed time with a predetermined stale access time threshold value; and means for adjusting a relevancy rating of said at least one of said plurality of informational items if said elapsed time exceeds said predetermined stale access time threshold value.

13. The apparatus for temporally updating relevancy ratings according to claim 12, further comprising:

means for updating said most recently accessed time to be equal to a time of said detected present access of said at least one of said plurality of informational items.

14. The apparatus for temporally updating relevancy ratings according to claim 13, further comprising:

means for storing said updated most recently accessed time of said at least one of said plurality of informational items.

15. The apparatus for temporally updating relevancy ratings according to claim 14, further comprising:

an input interface adapted to receive said stale access time threshold value from a user of said information retrieval system.

16. The apparatus for temporally updating relevancy ratings according to claim 13, wherein:

said means for adjusting said relevancy rating is adapted to decrease said relevancy rating by a predetermined temporal adjustment factor.

17. The apparatus for temporally updating relevancy ratings according to claim 16, wherein:

said temporal adjustment factor is determined based on a desired temporal sensitivity of said relevancy ratings.

18. The apparatus for temporally updating relevancy ratings according to claim 17, wherein:

said temporal adjustment factor is determined empirically.

19. The apparatus for temporally updating relevancy ratings according to claim 16, further comprising:

an input interface adapted to receive said temporal adjustment factor from a user of said information retrieval system.

20. The apparatus for temporally updating relevancy ratings according to claim 12, further comprising:

means for storing said adjusted relevancy rating for said at least one of said plurality of informational items.

21. The apparatus for temporally updating relevancy ratings according to claim 12, wherein:

said stale access time threshold value is determined based on a desired temporal sensitivity of said relevancy ratings.

22. The apparatus for temporally updating relevancy ratings according to claim 21, wherein:

said stale access time threshold value is determined empirically.

23. A computer readable storage medium having stored thereon a computer program for implementing a method of temporally updating relevancy ratings of a plurality of informational items in a information retrieval system, said computer program comprising a set of instructions for:

detecting an access of at least one of said plurality of informational items, said at least one of said plurality of informational items having a most recently accessed time, said most recently accessed time indicating time at which said at least one of said plurality of informational items was lastly accessed;

determining an elapsed time since said most recently accessed time;

comparing said elapsed time with a predetermined stale access time threshold value; and adjusting a relevancy rating of said at least one of said plurality of informational items if said elapsed time exceeds said predetermined stale access time threshold value.

24. The computer readable storage medium according to claim 23, wherein said computer program further comprising one or more instructions for:

updating said most recently accessed time to be equal to a time of said detected present access of said at least one of said plurality of informational items.

25. The computer readable storage medium according to claim 24, wherein said computer program further comprising one or more instructions for:

storing said updated most recently accessed time of said at least one of said plurality of informational items.

26. The computer readable storage medium according to claim 23, wherein said computer program further comprising one or more instructions for:

storing said adjusted relevancy rating for said at least one of said plurality of informational items.

27. The computer readable storage medium according to claim 23, wherein:

said instructions for adjusting said relevancy rating are adapted to decrease said relevancy rating by a predetermined temporal adjustment factor.

28. The computer readable storage medium according to claim 27, wherein:

said stale access time threshold value is determined empirically.

29. The computer readable storage medium according to claim 23, wherein:

said stale access time threshold value is determined based on a desired temporal sensitivity of said relevancy ratings.

30. The computer readable storage medium according to claim 23, wherein:

said temporal adjustment factor is determined based on a desired temporal sensitivity of said relevancy ratings.

31. The computer readable storage medium according to claim 30, wherein:

said temporal adjustment factor is determined empirically.

32. The computer readable storage medium according to claim 23, wherein said computer program further comprising one or more instructions for:

allowing a user of said information retrieval system to directly input said stale access time threshold value.

33. The computer readable storage medium according to claim 23, wherein said computer program further comprising one or more instructions for:

allowing a user of said information retrieval system to directly input said temporal adjustment factor.

* * * * *